United States Patent [19]

Conn, Jr.

[11] 4,043,498
[45] Aug. 23, 1977

[54] METHOD OF PLASTIC FLOW DIFFUSION BONDING

[75] Inventor: Charles E. Conn, Jr., Santa Ana, Calif.

[73] Assignee: TRE Corporation, Beverly Hills, Calif.

[21] Appl. No.: 613,223

[22] Filed: Sept. 15, 1975

Related U.S. Application Data

[63] Continuation-in-part of Ser. No. 441,441, Feb. 11, 1974, Pat. No. 3,950,841, and a continuation-in-part of Ser. No. 357,359, May 4, 1973, Pat. No. 3,936,920.

[51] Int. Cl.² .................................................. B23K 19/00
[52] U.S. Cl. ................................. 228/265; 228/157; 228/193; 29/156.8 B
[58] Field of Search ................... 228/141 A, 157, 181, 228/193; 29/156.8 B, 156.8 H, 156.8 P

[56] References Cited

U.S. PATENT DOCUMENTS

| | | | |
|---|---|---|---|
| 3,068,565 | 12/1962 | King et al. | 228/181 |
| 3,365,787 | 1/1968 | Forsberg et al. | 228/157 OR |
| 3,444,608 | 5/1969 | Conn Jr., et al. | 228/181 X |
| 3,547,599 | 12/1970 | Muser et al. | 228/193 X |
| 3,590,466 | 7/1971 | Moshammer et al. | 228/141 A X |
| 3,612,389 | 10/1971 | Green | 228/193 X |
| 3,633,267 | 1/1972 | Deminet | 228/181 |
| 3,635,070 | 1/1972 | Hoyle et al. | 29/156.8 B X |
| 3,736,638 | 6/1973 | Stone | 29/156.8 H |
| 3,903,578 | 9/1975 | Rothmann | 29/156.8 H |

Primary Examiner—James L. Jones, Jr.
Assistant Examiner—K. J. Ramsey
Attorney, Agent, or Firm—Blakely, Sokoloff, Taylor & Zafman

[57] ABSTRACT

The present invention relates to a method for diffusion bonding metallic detail parts to form a structural component. This invention presents an efficient low cost method of establishing and maintaining the required intimate surface contact for solid state diffusion bonding. This contact is achieved by configuring the metallic details such that sufficient stability is present to permit applying bonding forces sufficiently great to plastic flow the to-be-joined surfaces into intimate contact. The self-stability of the detail parts eliminates the need for support tooling and the plastic flow to achieve intimate contact eliminates the need for close tolerance preparation of the detail parts. This method is particularly applicable to the fabrication of hollow internally stiffened structural components in which the shell skins are non-parallel; such as turbofan/turbojet engine vanes and blades.

14 Claims, 25 Drawing Figures

METHOD OF PLASTIC FLOW DIFFUSION BONDING

RELATED APPLICATIONS AND DISCLOSURE DOCUMENTS

This application is a continuation-in-part application of my copending application entitled "METHOD OF LOCAL PLASTIC FLOW DIFFUSION BONDING OF METALLIC MEMBERS", filed Feb. 11, 1974, and assigned Ser. No. 441,441, now U.S. Pat. No. 3,950,841, and of my application entitled "AERODYNAMIC SHELL STRUCTURE WITH FITTINGS AND METHOD FOR FABRICATING SAME" filed May 4, 1973, and assigned Ser. No. 357,359, now U.S. Pat. No. 3,936,920. This application is based at least in part upon the information filed at the U.S. Patent Office on Nov. 1, 1974 under the Disclosure Document Program, No. 036472.

BACKGROUND OF THE INVENTION

1. Field of the Invention

This invention relates generally to a method for achieving the required intimate contact of metallic detail parts to be joined by solid state diffusion bonding by properly shaping the detail parts to permit application of sufficient force to plastic flow the material into the required intimate contact.

2. Prior Art

Aerospace power conversion equipment which utilizes the change in velocity and direction of gas flow requires the use of rotating blades and stationary vanes. For airborne equipment it is necessary that sturctural concepts, yielding maximum strength and stiffness to weight ratios, be utilized to achieve the required power to weight efficiency. Blades and vanes are thin aerodynamic shapes with varying degrees of camber, twist, and thickness, as a function of the gas flow requirements. The gas pressure and flow characteristics impose bending strength and stiffness requirements upon the structural configuration of the blade or vane.

It is known that the lightest weight structures are achieved by utilizing a material having a high strength to weight ratio in conjunction with a structural configuration which places this material at the periphery of the structure, i.e., a hollow section. However, when using a hollow section with thin material, the material becomes unstable in compression and shear buckling modes. The use of internal stiffeners to stabilize the thin facing skins of hollow sections has been developed and proved in service for many years. While such internally stiffened shell structures are known in the prior art, they have been used in substantially planar configurations and large shells, and heretofore it has not been known how to fabricate them in the intricate shapes and with geometric forms required by many applications, such as, for example, the relatively small aerodynamic blades and vanes. Thus, the present invention now makes available for applications requiring contoured structures, the significant advantages of lightweight, structurally efficient, thin skin shell structures with internal stiffening material. Such lightweight structurally efficient shell structures are highly advantageous when used in applications such as, for example, power conversion equipment, helicopter blades and turbo engine fan blades and vanes. In addition, the present invention achieves its high structural strength to weight ratio within the economic constraints of system cost effectiveness whether used for flat sandwich panels or shell structures for such applications as aerodynamic blades and vanes.

The most common method today for fabricating aerodynamic blades and vanes is by forging solid blanks, followed by 100% machining to achieve the desired shape and contours. While net precision forgings may also be produced, these require use of special alloys known in the art, but the latter are not as efficient as the higher strength wrought alloys. In the case of larger vanes, built-up brazed assemblies are typically produced. Each of these present methods are relatively costly and produce structures which are heavier than desirable. Recent "advances" in the art, such as the filling of hollow structures with suitable potting compounds, have enabled the production of somewhat lighter vanes. However, the vanes so produced have suffered from a disappointingly high failure rate because of the strain incompatability of dissimilar materials. A further shortcoming of blades and vanes produced by the methods of the prior art, other than solid structures, are their susceptibility to catastrophic failure caused by foreign object damages.

The invention disclosed in my earlier filed patent application, Ser. No. 357,359, taught one method utilizing prefabricated panel material to overcome these shortcomings and limitations of the prior art. The present invention represents a further advancement in the method of fabricating shell structures having extremely lightweight and great structural integrity. By the use of a specifically designed self-stable internal sheet metal stiffener, the required intimate surface contact for diffusion bonding can be achieved by plastic flowing the detail stiffener or stiffeners into the required contact simultaneously with the diffusion bond joining of the leading and trailing edges. The present invention thus lowers costs, yet produces a unique shell structure design which is extremely strong.

The phrase "structural integrity", as used herein, relates to the strength and stiffness of the structure per pound, and its resistance to catastrophic failure from foreign object damage. High structural integrity is attributable to the parent-material homogeneity achieved by the diffusion bonded joining techniques disclosed herein. The value of this invention is best illustrated by reference to turbofan engine fan blades. As indicated above, these blades are now typically machined from solid material. Hollow, internally stiffened shell structured blades made of the same material by the present invention would have approximately one-third of the weight of aforedescribed solid blades. Weight saved on a rotating fan blade results in additional weight and economic savings in the full engine configuration by virtue of the reduction of the loads on the fan disc, main shaft, bearings, support structures and containment shrouding. The weight saving multiplier in a typical turbofan engine is in the range of 3-5. Thus, for each pound of weight saved on a fan blade, 3 to 5 pounds of weight can be saved in the totally configured engine.

The present techniques for producing homogeneous material structural components include machining from bar or plate stock, net forging, forging plus machining and extruding (for constant section members). These production techniques are not applicable to the fabrication of thin wall and hollow sections with internal stiffeners. In addition, the cost of machining aerodynamic thin shapes with various thickness, camber and twist from solid stock is very high.

Because of the limitations on producing one-piece homogeneous internally stiffened aerodynamic shell structures, techniques for joining components of the vane or blade together must be used. All typical production methods of joining metals, such as by riveting, bolting, welding, brazing, organic bonding and polyimide bonding result in a load transfer capability lower than that of the parent material utilized; i.e., they do not achieve the required homogeneous properties and strain rate of the parent material across the joint. Solid state diffusion bonding techniques as used in the present invention, on the other hand, provide (i) a means for achieving full parent material strength across the joint interface because no foreign material is utilized; and (ii) strain compatability across the joint interface. Several diffusion bonding techniques have been developed, such as, for example, roll bonding, press bonding and vacuum bag bonding. Each of these known techniques of diffusion bonding and their respective limitations and shortcomings are briefly described hereinbelow.

The roll diffusion bonding technique utilizes a steel tooling retort with positioning filler tooling to locate the members to be joined in proper respective positions. The intimate contact is established by roll reducing the retort/tooling and to-be-joined parts by a sufficient percentage (generally 50% to 60%) to guarantee completely intimate surface contact and diffusion bonding. This process utilizes expendable tooling and is basically limited to the attachment of members in the rolling direction. For complex shaped parts such as vanes or blades, this expendable tool is cost prohibitive.

The press diffusion bonding technique utilizes reusable positioning and restraining tooling and massive hydraulic presses as the pressure source to establish the intimate contact. However, to utilize reusable tooling, the local surface deformation is generally limited to less than 5%. This requires the surfaces to be joined to be matched within very close tolerances. In addition, it also requires, because of the relatively low local unit pressure, a long time at an elevated temperature to allow the diffusion cycle to complete. For complex shaped parts such as vanes or blades this close tolerance matching of detail parts is cost prohibitive.

The vacuum bag bonding technique utilizes atmospheric pressure as the pressure source and is therefore limited to very thin sheet structures which can attain the required intimate surface contact at this relatively low pressure, again with the requirement of detail parts matched within very close tolerance. Because of this low pressure, the time at an elevated temperature required to complete the diffusion cycle is very long.

As a result of the above-described limitations in the techniques of joining metals, prior art turbofan engine fan blades, for example, are either completely machined from wrought bar stock or forged and completely machined, notwithstanding the high cost of such methods and the lower strength to weight ratio of the resulting blade as compared to that attainable with hollow internally stiffened shell structures. The present invention, however, overcomes these limitations of the prior art and discloses a method of utilizing the plastic flow characteristics of metal at elevated temperature under pressure to achieve the intimate contact required for diffusion bonding. The unique self stable configuration of the internal stiffener disposed therein and diffusion bonded together presents a practical method for fabrication of complex shaped hollow internally stiffened parts such as vanes and blades.

BRIEF SUMMARY OF THE INVENTION

The present invention relates to a lightweight internally stiffened flat panel or shaped shell structure (e.g. of an aeordynamic shape) and a method for fabricating the same. The invention will be described in particular with reference to a typical titanium or aluminum alloy turbofan engine vane. However, it should be understood that while this description relates to vanes of a turbofan engine, it is applicable to substantially all aerodynamic shaped structures as well as to other flat or shaped members for applications requiring structurally efficient members. Also the invention is applicable to other suitable metals and alloys known in the art. Since the present invention comprises both the method for fabricating and the preferred structures produced thereby, the description of the invented method will also include a disclosure of the preferred embodiments.

The present invention presents an economically feasible design concept and fabrication technique paticularly useful for aerodynamic shaped structural members. To achieve this objective, it is required that the detail parts to-be-joined be kept simple and to a minimum in number. For example, in the present invention a uniquely shaped internal stiffener is used. This stiffener is self-stable under normal pressure loads, thereby doing away with the prior art's use of expensive and complicated stiffener support tooling. In addition, there is no need to close tolerance machine the detail parts in order to assure accurate matching of to-be-bonded surfaces. The low cost approach is to utilize wrought alloy sheet stock and fabricate the detail parts by simple shearing operations (with no subsequent edge preparation) and bend forming. Close tolerances are not required since the oversize parts are plastic flowed to establish the intimate contact required for diffusion bonding. The required pressures for this plastic flow of materials requires that the details be self stable and will not collapse. One need only to secure the ends thereof in a slot or the like in the die forming tooling and the proper positioning of the stiffener is achieved.

The solid state diffusion bond juncture of the upper to lower skins to form leading and trailing edges is achieved by local plastic flow of material provided on the detail parts. The interference fit of the detail parts with the die provides for high, localized pressures on these juncture areas, and the die also forms the required finished part shape. The internal stiffening member due to the interference fit is normally slightly deformed in the final configuration. The formed internal stiffener is shaped and made to provide sufficient support for the face sheets during the diffusion bonding process; therefore, no internal stabilizing tooling is required. Moreover, the size and shape of the internal stiffening member is chosen such that it is self-stable to normal loads with a sufficient predetermined excess material for plastic flow of the member to take place between the upper and lower skins to achieve the required intimate contact for diffusion bonding. In many applications only one self-stable internal stiffener may be needed; thus, reducing the number of and the need to align a plurality of stiffening members.

The internal stiffener may be made in a variety of configurations as required to satisfy the particular design requirements and the operational environment. For example, any bent-up combination of circular arc and straight sections such as, square wave, sine wave, or sawtooth shaped stiffeners may be used. The shape of the internal stiffener of the present invention is chosen to perform at least three novel and important functions; firstly, it provides stiffening for the relatively thin skins of the finished vane; secondly, it provides support for forming the face sheets and stability for the face sheets to resist back pressure from flow forming and diffusion bonding of the leading and trailing edge wedge angles; and lastly, it is self-stable under normal pressure and does not need any expensive tooling to support the stiffener under the normal plastic flow pressure required to flow the stiffener edge to skin intimate contact for diffusion bonding. In addition, the thickness of the internal stiffener also provides an adequate bonding area for joining the stiffener to the face sheets. In order to accomplish the above stated purposes, the stiffener must be self-stable under loads normal to the joint, these normal loads required for plastic flow to achieve the intimate contact and to accomplish the diffusion bond are in the order of 10000 to 15000 psi stress level (in the case of titanium alloy). The depth of material flowed, as a function of the skin contour change, is in the range of 0.010 to 0.060 inches.

The die assembly utilized for plastic flowing the detail parts, forming of the blade, and solid state diffusion bonding of (i) the blade shell sheets to the internal stiffener and (ii) the edges of the face sheets to form the leading and trailing edges will now be described. The die assembly is designed and fabricated following (i) a determination of the volume of material required to flow in order to achieve the desired juncture properties; (ii) a determination of the direction of the forming and joining force, or load application as a function of the geometry of the parts to be joined and the desired homogeneous juncture shape; (iii) establishment of the single direction die ram action required to apply the required pressure to the parts, and the die ram shape to achieve the desired part geometry; and (iv) establishment of the inert environment control required for diffusion bonding.

In general, solid state diffusion bonding requires the removal of surface films and oxides from the materials to be joined. Typical metals used to construct the invented shell structure are the wrought alloys such as titanium, aluminum, stainless steel, etc. In the prior art, a major problem of diffusion bonding an aluminum alloy material to form structural components is maintaining oxide-free surfaces. Merely cleaning the surface is not sufficient as aluminum forms a tough oxide in air thus inhibiting low cost procedures. The invented process utilizes pressure in a vacuum furnace press in the order of 5000 p.s.i. to flow the aluminum alloy and thus break up the tenacious surface film. The discovery that the problem of prior art aluminum diffusion bonding was due in large measure to the oxide film represents another problem which the present plastic flow process overcomes. This rapid oxidation of the wrought alloy surface is not nearly as critical for the titanium and stainless steel alloys, because they oxidize at a much slower rate. The titanium and steel alloys can be pickle cleaned to remove the surface oxide and if processed (diffusion bonded) within approximately 24 hours of cleaning, this appearance of re-oxidation of the surface is negligible.

The surfaces of the materials to be joined must achieve an intimate contact under pressure while at an elevated temperature. The higher the temperature, the greater is the molecular diffusion across the joint interface in a given interval of time. Different alloys require different temperature and time parameters. However, for each alloy the diffusion temperature is limited by the transformation temperature, i.e., the temperature at which the grain structure of the material will transform to a degraded strength configuration. The method of the present invention for solid state diffusion bonding the skins together and the stiffener to the skins and to other fittings as required, includes the selective positioning of required surplus material in the area of the materials to be joined so that plastic flow of the material achieves the required intimate contact for the solid state diffusion bondings of the materials. In addition, by the design of the die tooling, more fully described hereinbelow, high localized pressure is applied to the detail parts only in the joint area (because of the surplus detail parts material to be plastic flowed) through the use of existing conventional pressure equipment, such as, for example, a hydraulic press.

The diffusion bonding process requires the maintenance of an inert atmosphere during the time the detail to-be-joined parts are at the elevated temperature in order to prevent their oxidation. This inert atmosphere can be achieved by maintaining a vacuum or by utilization of an inert gas (e.g. argon, etc.). In the following description of this invention, the preferred approach described is one which utilizes the die tooling in a vacuum furnace press. It should be understood, however, that alternate approaches, such as die tooling as a vacuum retort, inert atmosphere furnace press, inert gas retort die assembly, or inert gas continuous purge, may also be used.

Following the cleaning of the die tooling and the parts to be joined, the parts are installed in the die assembly. The die assembly is installed in the vacuum chamber of the hot press and evacuated to at least a vacuum of $10^{-4}$ Torr. The assembly is then heated to a temperature approximately 50°–100° F below the transformation temperature of the alloy from which the parts are made. After a uniform temperature distribution is attained, pressure is applied to the heated die assembly for a suitable period of time to plastic flow the detail parts, form the blade, and to obtain solid-state diffusion bonding. After cooling in the furnace vacuum chamber, the blade is removed.

Thus, one of the principal objects of the present invention is to provide lightweight structurally efficient internally stiffened panels or shell structures having properties substantially equivalent to solid homogeneous structures. Typical examples of such structures are turbo-fan engine rotating blades and fixed vanes.

Another principal object of this invention is to provide a cost effective method for fabricating the aforesaid shell structures.

Yet another principal objective of the present invention is to provide an economically feasible method for solid state diffusion bonding of metal members by local plastic flow in the joint area, with the ability to achieve attachment in multi-directions and parent material properties in the joined areas and, thereby, to provide maximum fatigue life for the structure with no loss in strength due to in-service exposed to elevated temperatures.

The novel features which are characteristic of the present ivention, as well as other objects and advantages thereof, will be better understood from the following detailed description, reference being had to the accompanying drawings in which the presently preferred embodiments and method of the invention are illustrated by way of example.

BRIEF DESCRIPTION OF THE DRAWINGS

FIG. 6a is a perspective view of a skin blank and stiffener illustrating the plastic flow requirements at the internal stiffener as shown in FIG. 6b.

FIG. 6b is a cross-sectional view taken along lines 6b—6b of FIG. 6a.

FIG. 7a is a longitudinal cross-sectional view of a die assembly, with parts installed.

FIG. 7b is a cross-sectional view taken along lines 7b—7b of FIG. 7a.

FIGS. 13a through 13f inclusive, are perspective views of six exemplary types of self-stable internal stiffeners contemplated by the present invention.

FIG. 15 is a perspective view of a flat panel using the self-stable internal stiffener of FIG. 13a.

DETAILED DESCRIPTION OF THE INVENTION

Figure 4A:
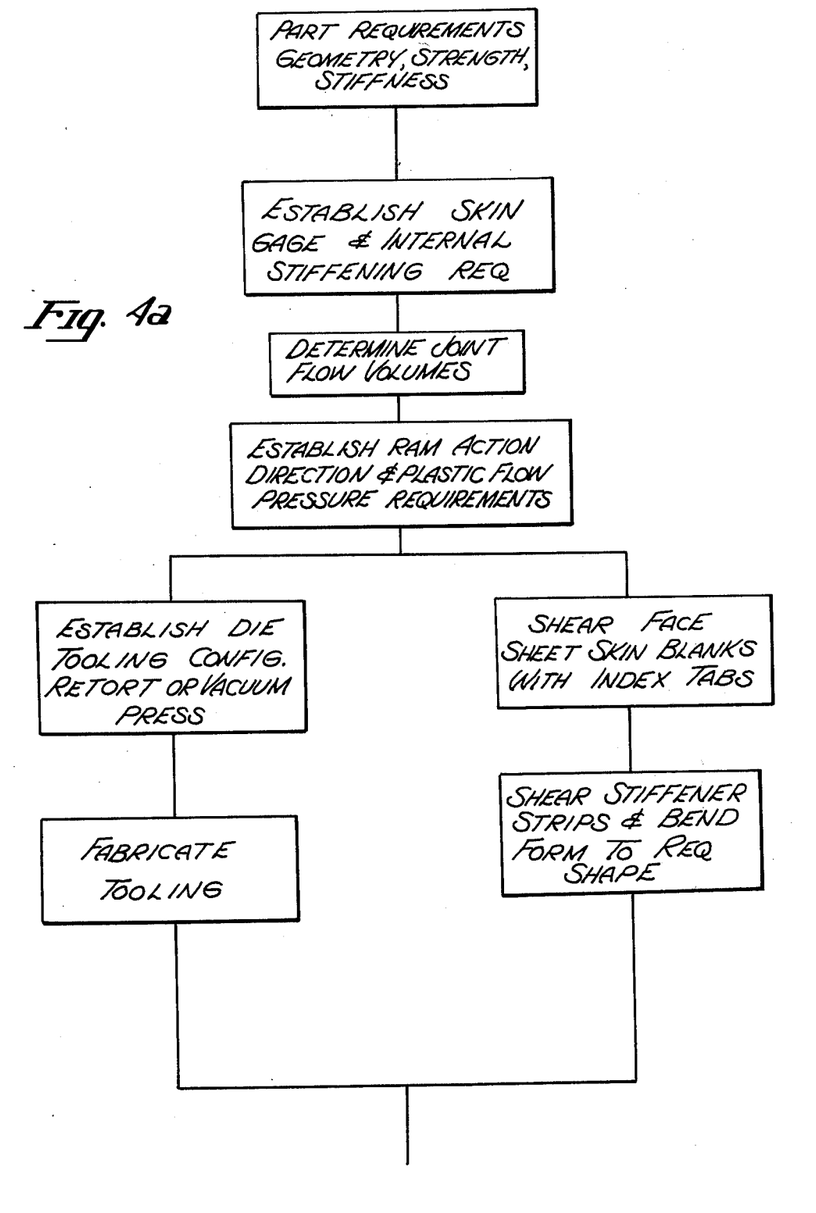
FIGS. 4a and 4b represent a functional block diagram showing the basic steps of the invented method as applied to fabricating an aerodynamic blade or vane.
Figure 4B:
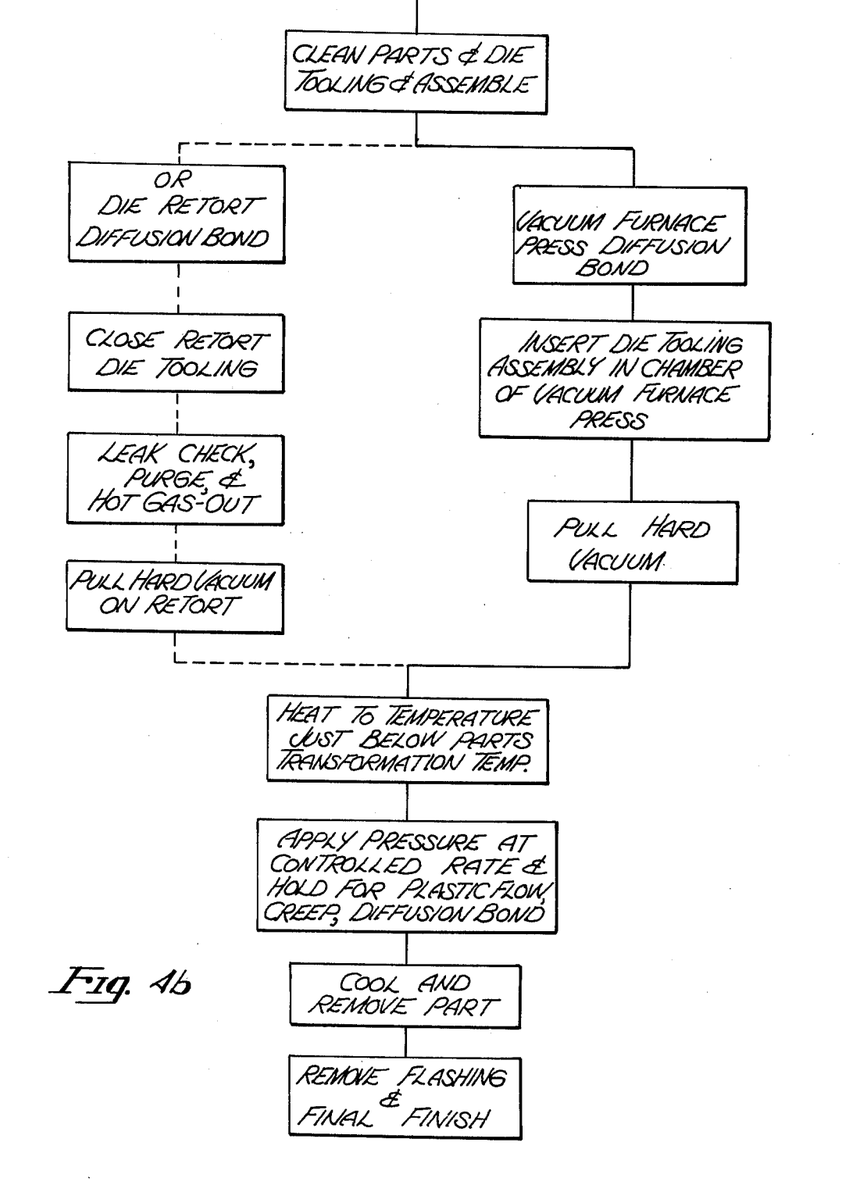

The present invention is now described in detail with respect to the fabrication of the preferred embodiments and methods. In all FIGURES like numerals are used to designate like elements. For a better understanding of the following description, reference should be made to the block diagrams of FIGS. 4a and 4b which functionally depict the sequence of the steps comprising a preferred method of the present invention.

Figure 1:
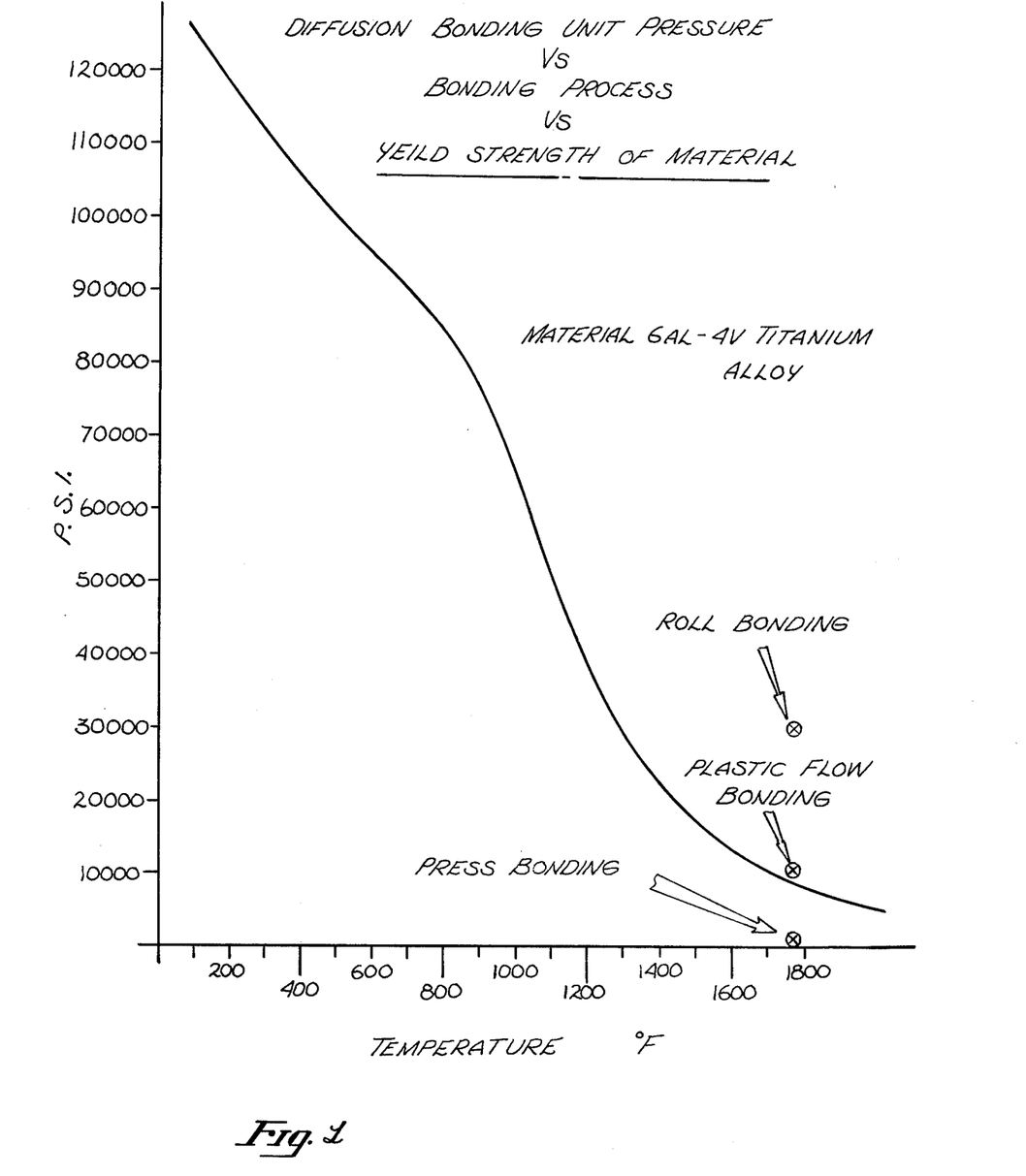
FIG. 1 is a graph showing the yield strength vs. temperature for various types of bonding of a 6AL-4V titanium alloy.

The basic principle of this invention compared to the state-of-the-art processes can best be illustrated by examining the typical strength versus temperature curve for a metallic alloy. FIG. 1 represents such a curve for 6 Al-4V titanium alloy. The transformation temperature of this alloy is approximately 1820° F., thus, the desirable diffusion bonding temperature is in the range of 1675° to 1775° F. The press diffusion bonding process, which requires close tolerance net detail parts, utilizes unit pressures in the to-be-joined areas in the range of 100 to 1000 psi to establish and maintain intimate contact. This local strain is well within the elastic limit of the material (in the range of 1 to 2% deformation) and produces only minor surface deformation. However, there is an almost absolute requirement for initial matched surfaces, and a much longer time is needed to complete the diffusion cycle because of the not perfect match. The roll diffusion bonding process utilizes the other extreme, the local pressures are so great (approximately 30,000 psi) the material readily flows to a new shape. The roll reduction also requires great local pressure since up to 50% of starting height is necessary to flow the material to twice its original length. Moreover, a stabilizing matrix material is required to support the to-be-joined details and to provide the die for the finished part. In the case of titanium diffusion bonding, this matrix material is usually carbon steel. This matrix material must then be removed after the roll reduction diffusion bonding process. The steel matrix material is generally removed by chemical leaching, thus greatly increasing the costs and complexity of the process. All of the tooling is expendable because of the roll reduction.

The invented process utilizes a local pressure, approximating the yield strength of the material at the diffusion bonding temperature, to plastic flow the details into intimate contact without close tolerance surface preparation. These local surfaces can be flowed approximately 0.010 to 0.080 inch to establish the required intimate contact. Positive overfill is always provided. Utilizing this approach, it is essential to configure the details to be joined such that they are stable (will not collapse) under the required local pressures. The unit pressure for titanium alloy is in the range of 10,000 to 15,000 psi at the diffusion bonding temperature of approximately 1775° F. At this pressure and temperature a complete diffusion bond is achieved in approximately 3 to 5 minutes of pressure dwell time. Aluminum bonding takes place at approximately 5,000 psi at a diffusion bonding temperature of approximately 1,000° F. By use of the invented method of plastic flow bonding, much lower costs are achieved, but without sacrificing strength.

Figures 2A, 2B, 2C:
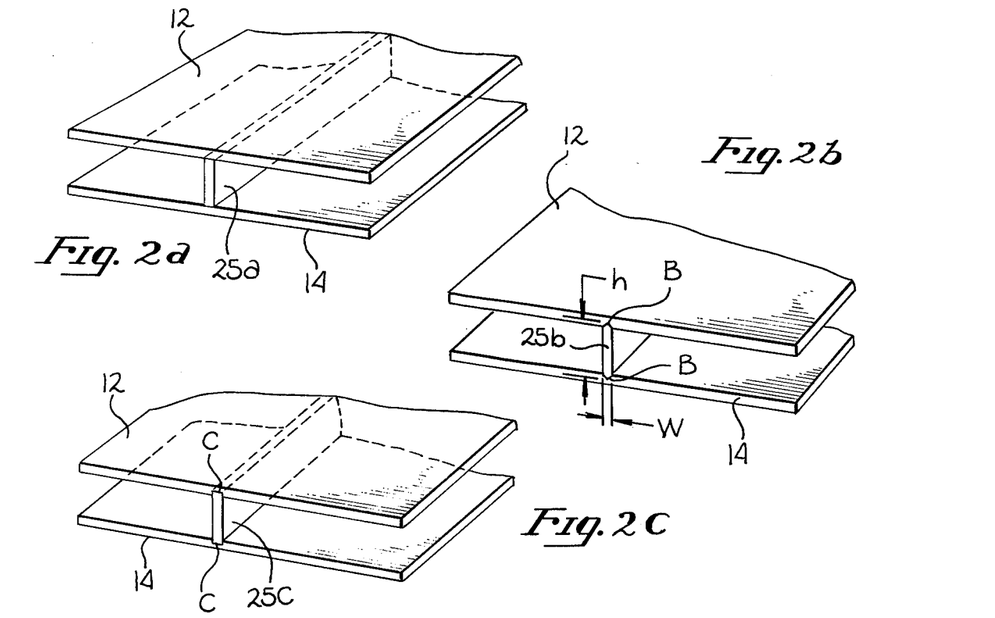
FIGS. 2a through 2c inclusive, are perspective views of three typical types of face sheets and their associated internal straight stiffeners.

Inasmuch as the use of the self-stable internal stiffener of the present invention represents a significant advance, it will be discussed first. If one were to consider the case of placing a relatively thin straight internal stiffener $25a$ between two face sheets 12 and 14, and applying a normal pressure (as illustrated in FIG. 2a), the stiffener $25a$ would be unstable as there are no side restraints and thus would fall over under load. However, if internal stiffener $25b$ were placed in a simple support mode such as vee slots B-B (as illustrated in FIG. 2b) it would be stable because of the added side restraint at the slot and force could then be applied to the buckling limit. The buckling limit being a function of the slenderness ratio which depends on the internal stiffener thickness $w$ and column height $h$ and the end fixity. The ability of the internal stiffener to support load could be further enhanced by providing end fixity support such as a matching slot C-C in both the upper and lower surfaces as illustrated in FIG. 2c. This would provide stiffener $25c$ with very stable support. Thus, as a function of the edge support conditions and the slenderness ratio, the parts detail geometry can be provided which will permit application of the required force to produce plastic flow of the details to provide the required intimate contact for diffusion bond joining of the details. In the embodiments where the internal stiffeners are disposed in a trough, vee slot, or other support member such as tooling fixtures on one or both face sheets, the flow volume must be calculated such that a die overfill condition exists to provide for plastic flow to achieve the required intimate contact of details to-be-joined. However, one obvious shortcoming of such a system is that the face sheets 12 and 14 must be precisely grooved or slotted. Such precise machining is expensive and time consuming.

It is, within the scope of this invention to provide simple face sheets with various configurations of self-stable internal stiffeners which are capable of maintaining their position and supporting the required pressure loads during the various formation steps hereinafter set forth. The presently invented internal stiffener, while it can be used with grooved or slotted face sheets, is self-stable without grooves or slots even under a load because of its stable shape and configuration. This stiffener lateral stability can be achieved by bend forming a simple sheared strip into a series of circular sections or circular plus straight sections to provide a wide foot print or base perpendicular to the height. This allows the use of face sheets without slots or grooves, yet still prevents the stiffener from falling over upon the application of load and during subsequent plastic flow and diffusion bonding.

Figure 3:
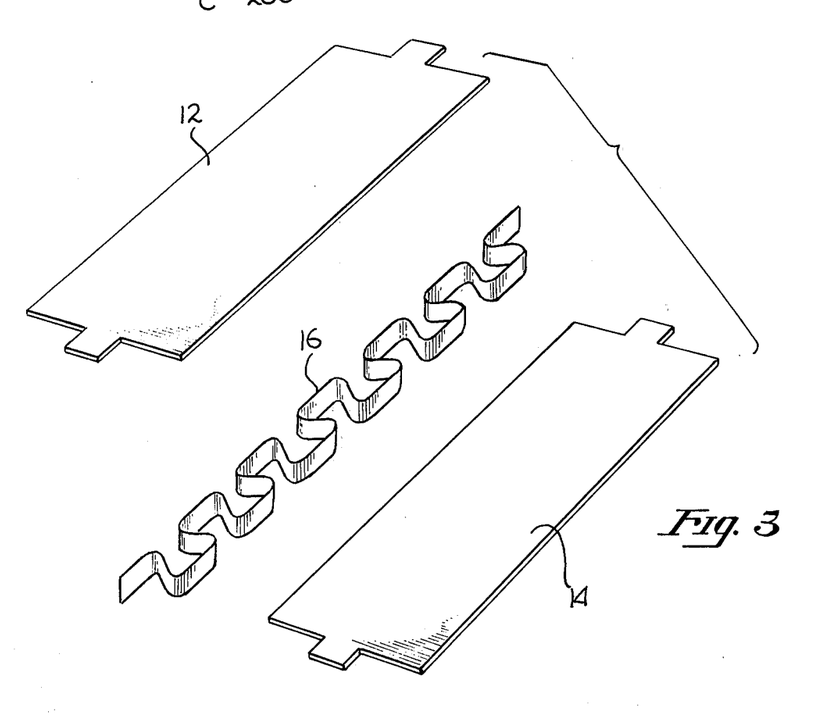
FIG. 3 is an exploded perspective view of the simple detail parts of a typical aerodynamic blade or vane comprising upper and lower face sheets with tabs for contour reference control and a generally omega shaped self-stable internal stiffener with straight portions at the apicies.

Providing stability to a relatively thin upstanding internal stiffener is a significant improvement over the grooved and slotted face sheet embodiments shown in FIGS. 2b and 2c. The generally omega type curvature and shape of the internal stiffener 16 illustrated in FIG. 3 provides a self stable section for the application of the plastic flow/bonding load, without the requirement of the slotted or grooved support provided in the face sheets as discussed above. The combination of curved elements and flat elements of the sheet can be configured as a function of the finished component geometry requirements and the plastic flow/diffusion bonding load requirements. As above, the slenderness ratio of stiffener 16 must be selected such that plastic flow and bonding with the face sheets 12 and 14 is achieved.

While many shaped metal stiffeners may be self-stable, some presently preferred shapes are seen in FIGS. 13a, 13b, 13c, 13d, 13e and 13f. Stiffeners 16, 160, 161, 162, 163 and 164 all possess the following properties: (i) they are configured and sized to be self-stable; (ii) they have a shape which, when bonded to upper and lower face sheets, provide face sheet support without the need for additional supporting elements; (iii) they have a predetermined amount of excess material generally on the top and bottom edges thereof such that the desired amount of plastic flow between the stiffener and the face sheets can take place; and (iv) they have ends which can be easily secured in a die assembly hereinafter described. In order to accomplish the above stated purposes, the stiffener must be self-stable under load and therefore requires a configuration and thickness combination in which the mass on either side of a planform central axis is substantially symmetrical. The term "self-stable stiffeners" as used herein means members having the above characteristics, configuration and properties.

The method steps of the present invention will now be presented in more detail as they apply to the formation of aerodynamic blades and vanes. (See FIGS. 4a and 4b.) The first step of the invented method is to evaluate the finished structure requirements with respect to structural integrity (i.e., concentrated load application points, strength and stiffness). From this evaluation, the internal stiffener and shell skin thickness are established.

With knowledge of the required finished part geometry, the joint flow volumes are then determined; that is, the volume of material required to provide positive flow material to establish the required intimate contact at the juncture. This volume of material, increased by approximately 5% to 10% over net requirements, provides positive fill without unnecessarily close tolerances, is then located on the to-be-joined parts in the juncture area. It can be located on either part or divided between the two parts as a function of part simplicity. The placement of this flow material in a simplified manner on the detail parts reduces (i) the parts complexity and (ii) the requirement for zero tolerance fit up of parts and the fit up of the parts in the die, such fit ups usually being required to achieve the intimate contact required for diffusion bonding. The volume of flow material is ultimately plastic flowed by the die action to achieve the intimate contact required for diffusion bonding. The die can be designed such that the surplus material at the leading and trailing edge joints on the face sheets 12 and 14 flows to the edge of the finished part and is trimmed off like flashing. The surplus or excess material on the internal stiffeners 16 for very stable stiffeners flows to increase the thickness of the stiffener material or for less stable sections flows to produce slight curvature or buckling to the stiffener height.

Having established the flow material volumes and the direction of their flow, the ram action direction is next determined. Since economic feasibility is one of the main objectives of this invention, the die set is designed such that only a single direction of external force is required. Internal force components caused by plastic flow in the joint areas are balanced by die body restraint. Thus, on a part such as a fan blade, with its high twist angle, the die set is designed to accomplish the diffusion bond on a partially twisted blade to maintain the single direction ram action force and minimize the side or end force components. The blade is later creep twisted to the total required twist angle.

The ram action force is determined from the flow volumes and distance of flow for the various required joints. This force and the duration of its application are determined from the plastic flow and creep characteristics of the materials to be joined at the diffusion bonding temperature. In addition, to the local joint lines of force required, the additional small force required for any other slight contour forming of parts is determined.

One feature of this invention is the utilization of simple flat sheared sheet metal skin blanks 12 and 14 for the upper and lower face sheets joined to a self-stable internal stiffening member which is sheared sheet metal bend formed to the desired configuration to form an aerodynamic shaped shell structure. Stiffener 16 is the presently preferred stiffener element for purposes of illustration and the process will be described with respect to the use of this stiffener. However, it is understood that other self stable stiffeners such as 160, 161, 162, 163, 164 (FIGS. 13b–13f) or other circular arc and flat element configurations can be substituted for stiffener 16. This embodiment minimizes the number of detail parts (3 sheet metal details) to be handled during the blade assembly diffusion bond cycle thereby lowering costs.

The accomplishment of a complete homogeneous diffusion bond joint between metallic members requires cleanliness, intimate contact, and exposure to elevated temperatures for a period of time long enough to allow the intersurface diffusion to be completed. In general, the intimate contact is established by pressure; further, the higher the pressure and temperature utilized, the shorter the diffusion time required.

For purposes of describing the preferred embodiments and process, self-stable stiffener 16 has been used primarily. However, other self-stable internal stiffeners can be used so long as they have the characteristics, configuration and properties previously discussed. The selection of a particular cover skin thickness and the use of a specific internal stiffener is a function of the load and dynamic environmental requirements of the application. FIGS. 13a–13f, inclusive, illustrate some preferred versions of self-stable internal stiffeners which are within the scope of this invention. As hereinbefore mentioned, self-stable stiffeners 16, 160, 161, 162, 163 and 164 are designed such that they contain a predetermined excess or surplus material, are self-stable and easily aligned in the die. The excess material is what is used to plastic flow to achieve the intimate contact required for diffusion bonding without the complexity of perfectly matching all the detail parts.

It has been found that certain configurations and shapes have excellent self-stablity properties. Stiffeners which are generally omega shaped (e.g. 16, 162, and 163) and sinosoidal shaped (e.g. 160 and 161) have excellent stability. The configurations can be varied between circular arc portions and straight segments as desired for a particular application. Straight stiffeners can also be made in a self-stable form. For example, stiffener 164 is comprised of two (or more) straight members 165 which are joined by one or more cross braces 166 to make a self-stable structure. It should be noted that all the self-stable internal stiffeners described above have suitable ends which can be easily secured in a die assembly, i.e. 16 has ends 13 and 15; 160 has ends 130 and 150; 161 has ends 131 and 151; 162 has ends 132 and 152; 163 has ends 133 and 153; and 164 has ends 134 and 154.

Figures 8, 9:
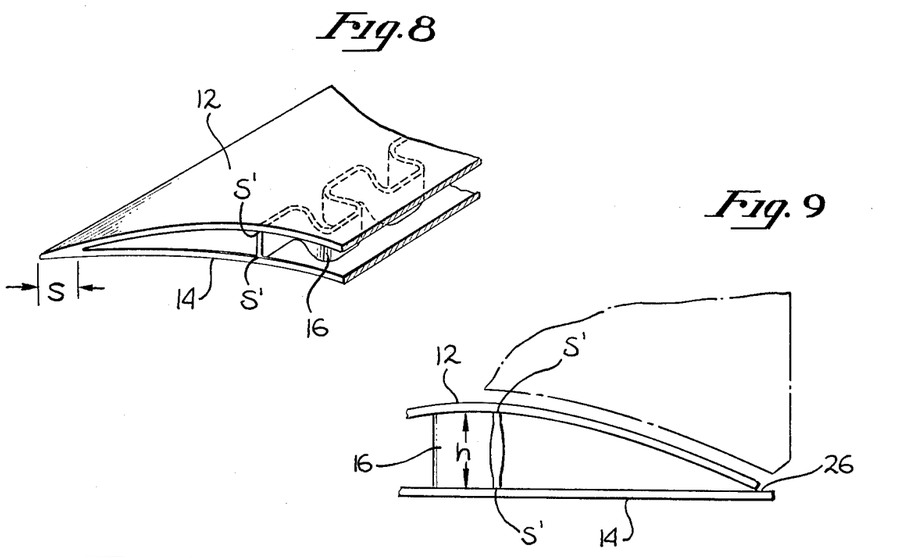
FIG. 8 is a partial front perspective view of a shell blade section showing a leading or trailing edge at the juncture of the edges of the upper and lower face sheets.
FIGS. 9-12 inclusive, are partial cross-sectional views of a shell blade section showing the manner in which the leading or trailing edge of FIG. 8 is formed into a homogeneous bonded juncture and the stiffener to face sheet juncture.
Figure 10:
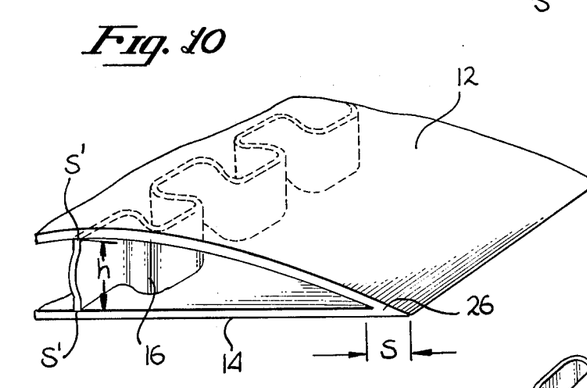
Figure 11:
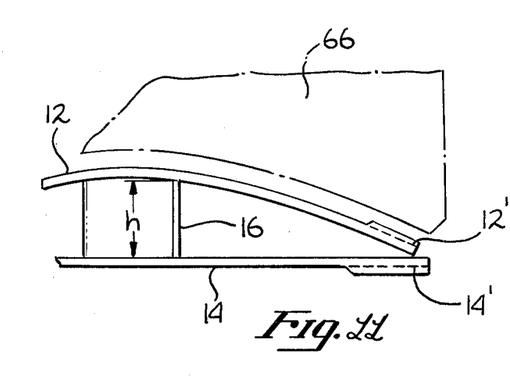
Figure 12:
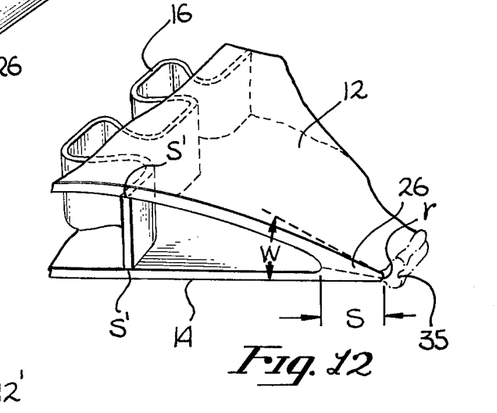

The leading and trailing edge flow volumes are the volumes required to create the degree of solidity "S" for the leading and trailing edge junctures 26 and 26' (See FIG. 14 ) respectively, formed by the edges of upper and lower face sheets 12 and 14, as shown in FIGS. 8, 10 and 12. The flow volume between the stiffener 16 and the upper and lower face sheets 12 and 14 creates the intimate contact required and flows as thickening or bulging (See FIGS. 9 and 10). The next step is to determine the leading and trailing edge flow volumes and the flow volumes between the self-stable internal stiffener and the upper and lower face sheets. To maintain the simple configuration, face sheets 12 and 14 are made with the thickness required to provide the flow volume material previously determined as necessary for leading and trailing edge solidity. The balance of each face sheet 12 and 14 in the direction away from the edges thereof can be reduced in thickness to whatever is structurally required. The reduction of the thickness of face sheets 12 and 14 to satisy overall thickness requirements can readily be accomplished by existing conventional techniques, such as chemical milling, electrical discharge milling or machining, either in a single step or in multiple steps as a function of required area variation. FIGS. 9 and 10 show a leading edge joint 26 when the minimum flow material required to achieve acceptable solidity S is the same thickness as the balance of the face sheets 12 and 14. Added solidity S is achievable by adding flow volume 12' and 14' to the edges of face sheets 12 and 14, as shown in FIGS. 11 and 12.

Figure 5:
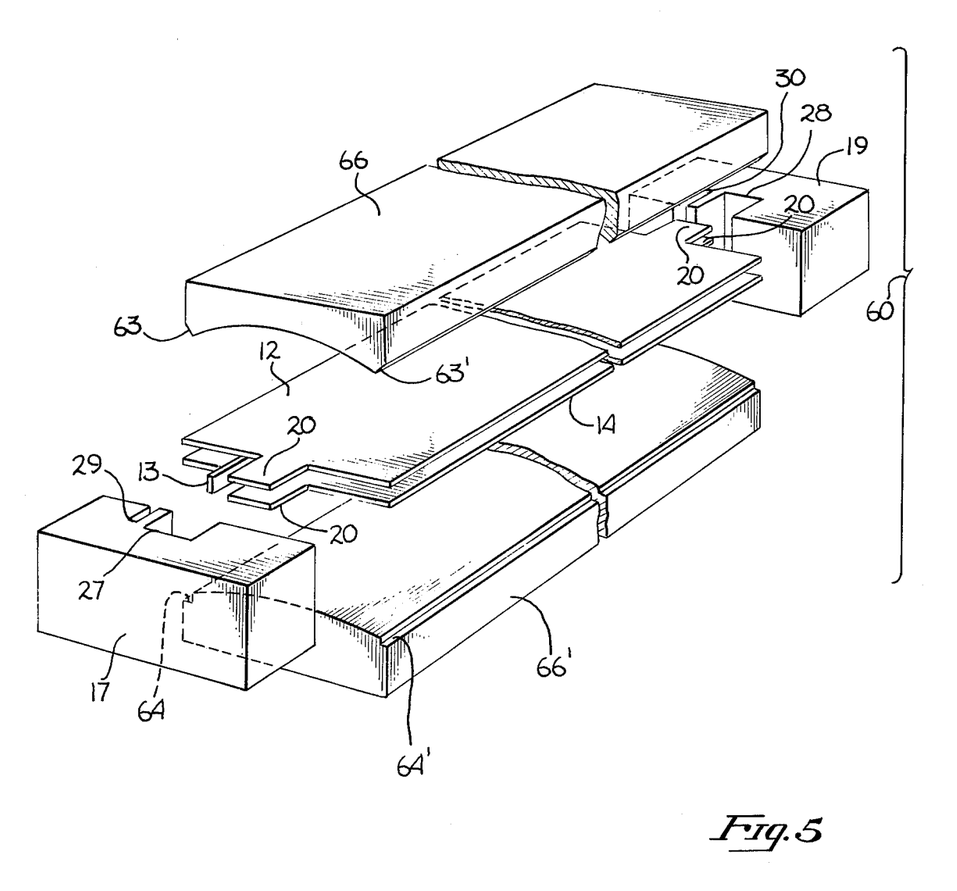
FIG. 5 is a perspective view of the sheet metal details interposed between matching dies and illustrating the indexing of the detail parts.
Figures 6A, 6B, 7A, 7B:
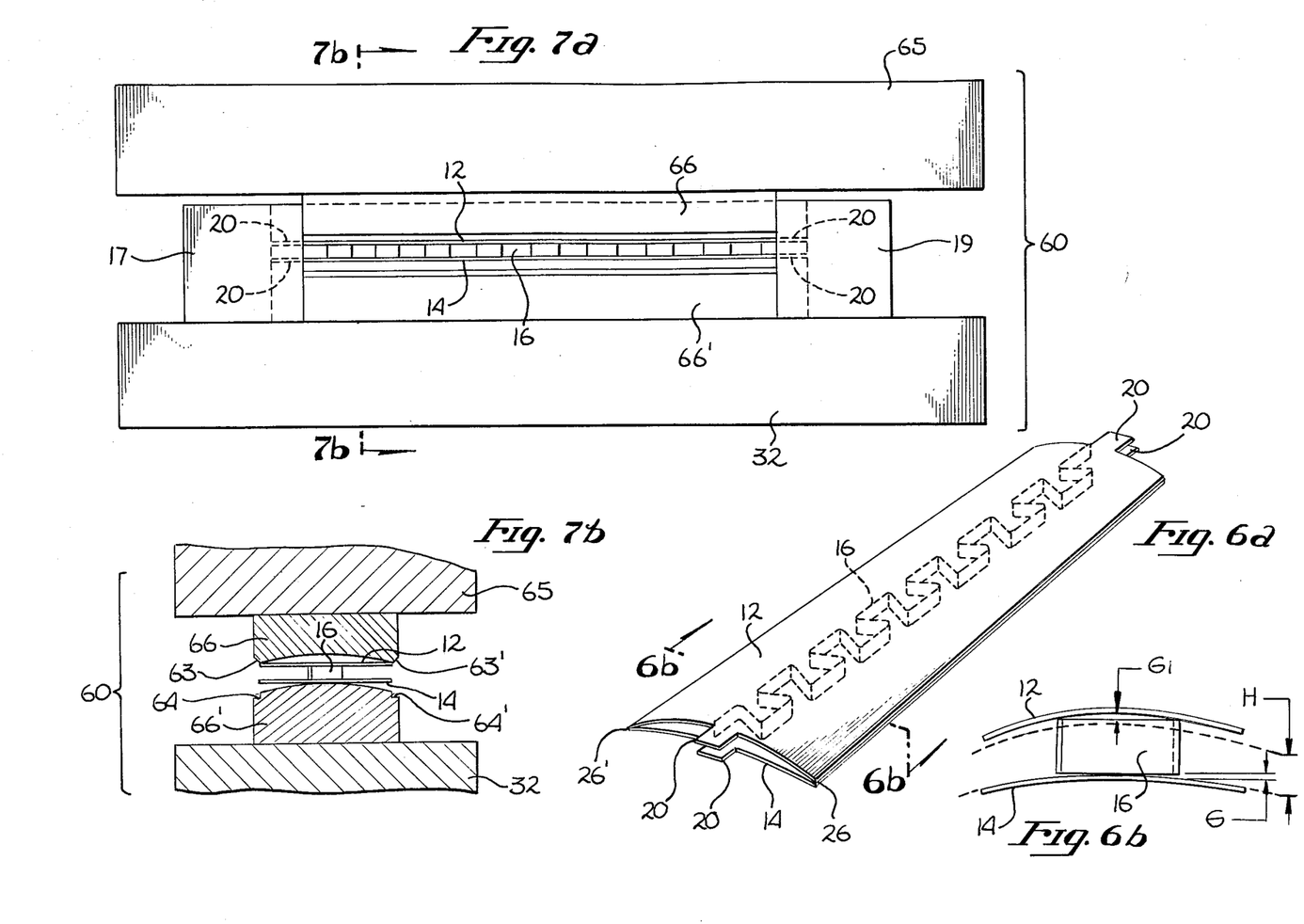

Next, the sheet metal details are placed between dies 66 and 66' of die assembly 60 as shown in FIGS. 5, 7a, and 7b. The tabs 20 of the upper and lower face sheet 12 and 14 are positioned in the tooling blocks 17 and 19 in the corresponding tab slots 27 and 28. The lower face sheet 14 is first disposed with tabs 20 in tab slots 27 and 28. The internal stiffener 16 is now disposed above the lower face sheet 14. Note that ends 13 and 15 are specifically designed to be easily disposed in slots 29 and 30 of the tooling blocks. This enables the stiffener 16 to be aligned without the expense and time associated with the alignment of prior art stiffeners. After the stiffener 16 is inserted, the upper face sheet 12 is placed in the die assembly.

The flow volume for the stiffener is added to the finished height of the stiffener (See FIG. 6b). In order to obtain the desired finished geometry height H the minimum interference fit is in the range of 0.005 inch. Thus, the minimum stiffener height must be: finished geometry height H + 0.005 + 0.005 + [G] or [G'] (whichever is the greater).

Another unique aspect of the present invention is achieved by providing the tooling blocks 17 and 19 with the slots 29 and 30 for the stiffener 16 as there is now no need to establish any type of support or alignment member for the stiffener on the inside surface of the lower face sheet. This simple method of alignment represents one of the unique aspects of the present invention. However, additional supporting surfaces (e.g. slots or grooves) can be used to provide extra support for the internal stiffener 16 if desired. In the presently preferred embodiment, the tooling blocks 17 and 19, and the lower ram 66', are held in relative position by attachment to a press ram base 32.

After the internal stiffener 16 is disposed in its associated slots, the top face sheet 12 with its tabs 20 is disposed over the stiffener and between the tooling blocks 17 and 19. The face sheets are now ready to be shaped by the action of the dies 66 and 66' and the stiffener plastic flowed to the required height. Dies 66 and 66' are fabricated to achieve the desired vane or blade shape. Another advantage of the present invention is that extremely close tolerances for the upper and lower face sheets 12 and 14, as well as the internal stiffener 16, are not required. Any excess material along the leading or trailing edges of the sheet appears as flashing 35 (See FIG. 12) and is subsequently removed. A slight excess of material on the internal stiffener 16 creates thickening or bowing of the stiffener web and does not adversely affect the strength or overall contour.

With proper maintenance of the various detail parts, no contour machining of the finished part is normally required. The only machining required following diffusion bonding is to remove flashing 35 as illustrated in FIG. 12. The mating surfaces of the die assembly 60, utilized for the local plastic flow of the juncture material, are shaped in a manner to permit over-fill material to flow to the periphery of the finished part in the form of flashing 35. This flow cavity, illustrated in FIGS. 5 and 7b, is formed by virtue of edges 63 and 63' of upper die ram 66, and edges 64 and 64' of lower ram 66'.

Die assembly 60 and detail parts over-fill are configured so that when pressure is applied on plate 65 the die ram 66 applies a pressure on the to-be-joined surfaces which is approximately 100 times the pressure on the surfaces which are merely being formed to the required contours. For example, when titanium 6AL-4V is used, the pressure at the joints is typically about 15,000 to 20,000 psi while at the formed surfaces only 200–300 psi.

The die parts are fabricated from an alloy which will not interdiffuse with the alloy parts being joined which are typically made of titanium or aluminum. An example of a typical alloy used for die parts is a stainless steel alloy having 22% chromium, 4% nickel and 9% manganese, available from Armco Steel. The use of non-interdiffusion alloys for die and the parts to be bonded eliminates the need for a parting compound and the associated disadvantage attributable to the tendency of parting compounds to migrate to the joint area where diffusion is to take place and thus prevent complete diffusion.

As discussed more fully hereinabove, several design steps must be completed prior to the forming and bonding step in the die assembly. First, from the geometry of the parts to be joined and the desired homogeneous juncture shape, the force application direction must be determined. In addition, the most economically feasible fabricable shape of the parts to be joined and the flow volume of material required to flow and achieve the desired juncture must also be determined. Overfill flow material must be provided so that intimate contact can be established during the application of force without requiring near zero tolerances on the relatively complex shaped parts being joined.

Also, prior to the forming and bonding step in die assembly 60, the upper ram 66 and the lower ram 66' must be designed and made in such a manner as to enable the application of the required loads to the area to be flowed and positive closed position stops provided to assure finished part net dimensions. In addition, the upper ram 66 and lower ram 66' must be shaped so as to achieve the desired finished part geometry. It is well known that, at elevated temperatures, metallic materials will plastic flow and creep flow if pressure is applied to them for finite periods of time. It is this plastic flow characteristic of metallic materials which makes possible the intimate surface contact and shaping attainable by this invented method of solid state diffusion bonding. It is preferable to use the highest elevated temperature, up to the limit of the transformation temperature of the alloy. In the case of 6Al-4V titanium, for example, the transformation temperature is approximately 1820° F, and, thus, the upper limit operating temperature. However, the transformation temperature will vary from heat batch to heat batch of a production alloy; thus, a safe operating temperature for diffusion bonding is approximately 50° F to 100° below the published transformation temperature for the particular alloy. For the alloys to be diffusion bonded, the plastic flow characteristics as a function of temperature, load, and rate of load application can be readily determined. Based upon these kind of data, upon the projected area of the material to be flowed and the ram travel required, the required ram load forces are determined.

A still further preparatory step done prior to the bonding and forming step, is to provide additional or surplus plastic flow material along the required edges of the face sheets 12 and 14 on the internal stiffener 16. As discussed above, the purpose of this is to provide the necessary volume of material to plastic flow to the required geometry of the parts juncture. The selective reduction of the thick face sheet material can be accomplished by techniques known to the state of the art; such as machining, electrical discharge removal and mechanical milling. Chemical milling is presently considered to be the most economical and practical method.

The achievement of a solid state diffusion bond joint requires that the surfaces to be joined are clean, free of surface oxides and other foreign contaminants, organic and otherwise. The requisite state of cleanliness must be maintained throughout the joining process. Therefore, prior to loading the die assembly 60, each of the separate components to be joined is cleaned by acid pickling techniques known in the trade, which pickling removes the surface oxides. The alloy steel parts of the die assembly 60 are solvent cleaned to remove all organic contaminants. A typical solvent suitable for this purpose is acetone. The preferred method of maintaining the desired state of cleanliness during the heat processing of the diffusion bond is to use a vacuum environment such as $10^{-4}$ Torr minimum. The requisite vacuum is attainable by use of a vacuum furnace press.

Assembly of die tooling and the installation of sheets 12 and 14, and the stiffener in the requisite tooling blocks is preferably done in a dust-free atmosphere. Contamination due to handling is reduced substantially by the use of clean white gloves. The parts must be positioned in their correct spatial relationship within the die assembly 60. The die assembly 60 and detail parts, while the vacuum of at least $10^{-4}$ Torr is maintained, is heated to approximately 50° F to 100° F below the alloy transformation temperature. Heating can be accomplished in a vacuum furnace hot press. In the case of titanium alloy 6Al-4V, the temperature used is about 1725° F and for aluminum 1000° F is used. The loaded die assembly is allowed to soak at this temperature for a sufficient period of time to ensure uniform temperature distribution. The temperature is maintained at approximately 50° to 100° F below the theoretical transformation point since the process temperature must not exceed the actual transformation temperature of the particular alloy in order to maintain the original wrought properties of the materials to be joined. However, as indicated above, the highest practical temperature should be used to achieve the greatest possible degree of plastic flow.

At this point in the invented method the required load (pressure) is applied to the heated die assembly 60 at the required rate and held for the required time. There are a number of different means for applying the load as a function of the equipment available. A preferred method is a vacuum furnace hot press. After the required deformation is achieved, the load pressure is maintained for the predetermined time to utilize the creep characteristics of the blade material so as to enhance the finished part tolerance control by complete closure to the die stops. This takes advantage of creep deformation, which typically occurs in addition to complete plastic flow, to fill the die cavity. The specific ram force is a function of the joint interface area. The usual pressure for the projected bond line areas for aluminum is 5000 psi and 15,000 to 20,000 psi for titanium.

During the load application step, the leading and trailing edges 26 and 26' are formed with the specified degree of solidity S. The upper and lower face sheets 12 and 14 and the self-stable internal stiffener 16 form intimate contact as shown in FIGS. 8, 10 and 12. Solidity S, as used here, refers to the chord-wise depth of the solid portion of the leading and trailing edges, 26 and 26', formed by the juncture of the edges of face sheets 12 and 14. Solidity S allows for service damage to the edges, caused by foreign object impingement to be repaired by filing or machining the edges without getting into the hollow portion of the blade. The forming of the leading edge 26 is described with reference to FIGS. 9-12. The description is equally applicable to trailing edge 26'. FIG. 9 shows the respective positions of face sheets 12 and 14 interfacing along what will become the leading edge 26, prior to the application of the load. Following the diffusion bonding step, a homogeneous juncture is achieved, as shown in FIG. 10. An increased volume of local flow material 12' and 14' along the edges of the face sheets 12 and 14, respectively, is preferred for greater solidity S in the junction area. The addition of such flow material 12' and 14' is shown in FIG. 11. As a result of the plastic flow of added material 12' and 14', a solid state diffusion bonding leading edge 26 is achieved with substantially greater solidity S as shown in FIG. 12. Subsequently, leading and trailing edges 26 and 26' are machined to remove the flashing and provide the required radius r. Typically, the edge wedge and angle W and radius r are very smal; i.e., usually the wedge angle W is from 6° to 10° while the radius r is from 0.005 to 0.050 inches. The zone of solidity S achieved by the invented method is sufficiently wide to emcompass the required wedge angle solid section, as shown in FIG. 12. Machining for flashing removal is typically accomplished by a mill cutter. The method disclosed herein allows substantially greater design freedom with respect to the solidity S of leading and trailing edges 26 and 26'. For example, in the case of aerodynamic blades, leading and trailing edges 26 and 26', having a solidity depth of from 0.125 to 0.250 inches, can be readily achieved as compared with a depth of 0.060 inches achieved by the methods of the prior art.

With respect to the internal stiffener 16, the positive intimate surface contact is established between the stiffener and the two face sheets. This positive contact is achieved by the stiffener having a greater height by 0.010 to 0.080 inches than the final space between the face sheets. Finished part contours can allow this starting gap to vary anywhere throughout this range. (See FIG. 6b). The internal stiffeners shown in FIG. 13a-13f are some preferred configurations on suitable self-stable structures. Because the internal stiffener must plastic flow and diffusion bond with the face sheets 12 nd 14, the excess of material in the height $h$ (See FIG. 6b) is always provided and results in thickening (See FIG. 9) or bowing (See FIG. 10) of the stiffener web. Thus, the tolerances for the stiffener are always positive.

When the dies 66 and 66' form the face sheets 12 and 14 as hereinbefore described, one can see that the leading and trailing edges 26 and 26' completely close. This means that the space between the upper and lower face sheets is greatest in the center and decreases in a predetermined manner to the corresponding edges. The stiffener 16, originally of constant height, must plastic flow deform more as the stiffener 16 extends across the face sheets 12 and 14 and approaches the leading and trailing edges 26 and 26'. However, while there is some minor deformation of the stiffener 16 near the edges, the amount of thickening or bowing has negligible effect on the strength of the finished part. Thus, the stiffener 16 of this invention is substantially in its original configuration and forms an intimate and important part of the internal support of the blade or vane.

FIG. 6a shows the blade or vane blank after initial forming but prior to plastic flow bonding. The plastic flow is required at the leading and trailing edges 26 and 26' and at the joining surfaces of the stiffener 16 and the face sheets 12 and 14. FIG. 6b clearly shows how the starting gaps (such as G and $G_1$), previously discussed, appear between the straight sheared stiffener 16 and the inner curved surfaces of the face sheets 12 and 14. As stated above, the height of the stiffener 16 is always greater than the final space required between the face sheets for the final formed part. Therefore, as the die assembly 60 fully closes under pressure the excess material is caused to plastic flow thereby achieving complete bonding by intimate contact between the stiffener 16 and face sheets 12 and 14. The excess material either causes thickening or bulging (bowing) of the web of the stiffener.

Following the forming and bonding step, the diffusion bonded part is allowed to cool in the inert environment. After cooling, the diffusion bonded and formed part is removed.

Figure 14:
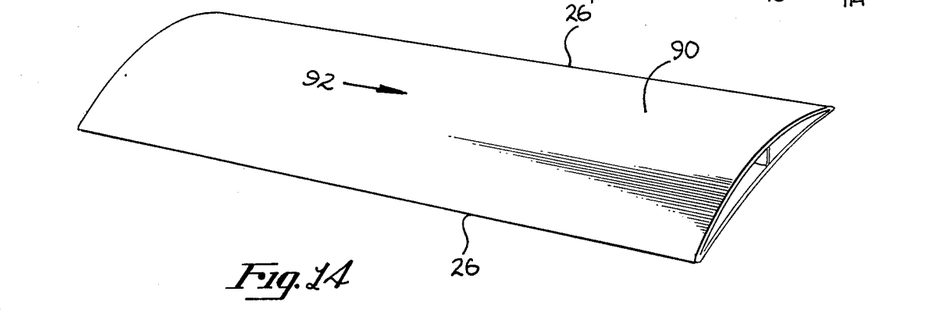
FIG. 14 is a perspective view of a final blade or vane after diffusion bonding of the various components.

The finished blade 90 shown in FIG. 14 has a thin airfoil shape in cross-section. It can have a variable thickness and variable chord and chamber along its longitudinal direction 92 and a variable angle of twist. The leading and trailing edges 26 and 26' have very small wedge angles, i.e., angles which approach the knife edge typical in aerodynamic applications. The result is a thin skin shell blade 90 having high strength and stiffness to weight ratios as required for maximum efficiency. In spite of the fact that only one internal stiffener is utilized for small chord blades, the blade 90 is substantially as strong or stronger than the prior art blades having a plurality of different types of stiffeners. For wider chord vanes or blades additional stiffeners of the above concept can be added as required.

Although this invention has been disclosed and described with reference to particular embodiments and to a preferred method, the principles involved are susceptible of other applications which will be apparent to persons skilled in the art.

Figure 13A:
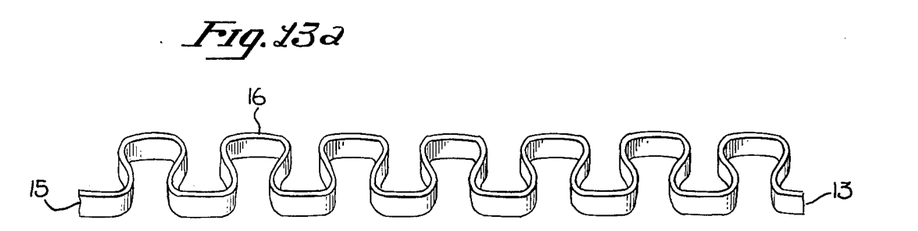
Figure 13B:
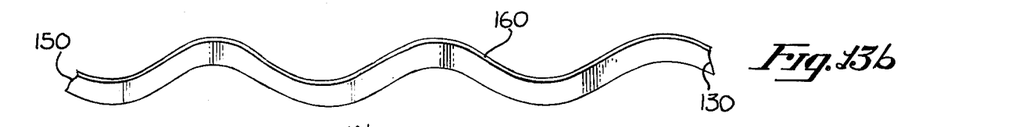
Figure 13C:
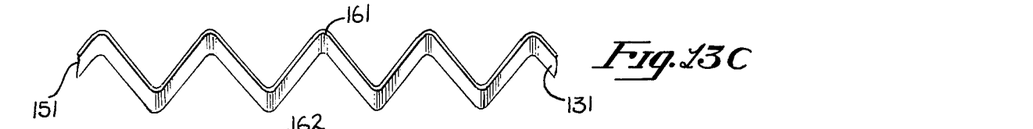
Figure 13D:
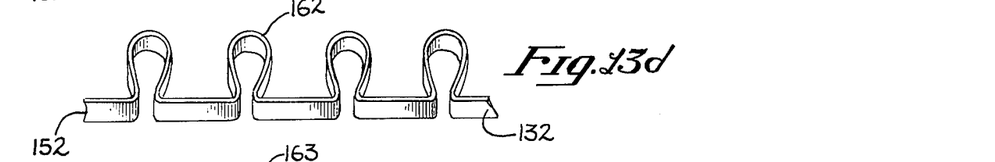
Figures 13E, 13F, 15:
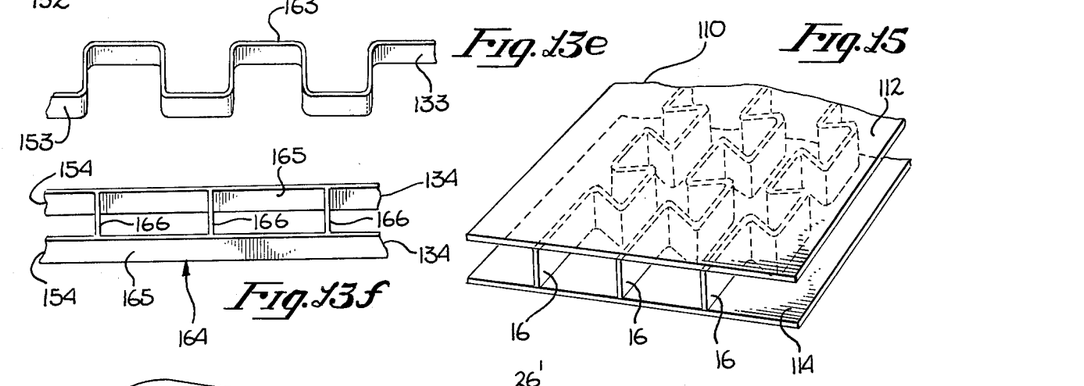

For example, as shown in FIG. 15, flat sandwich type panels or structural members 110 having a plurality of self-stable internal stiffeners 16 between face sheets 112 and 114 can be used for various aerospace and industrial applications in which honeycomb type panels have been used in the past. The same flow techniques discussed previously except for forming aerodynamically shaped shell structures are applicable to panels 110. Also, it should be understood that while specific reference has been made primarily to titanium base and aluminum base alloys as the preferred materials, other wrought alloys can be used such as stainless steel alloys, nickel base alloys, cobalt base alloys and columbium base alloys. It is understood that various changes in the form, detail and application of the present invention can be made by those skilled in the art without departing from the spirit and scope of the invention. This invention, therefore, is not intended to be limited to the particular embodiments or preferred methods herein disclosed.

The above basic concept of plastic flowing material from simple loose tolerance detail parts can be applied to the utilization of interleaf bonding, eutectic bonding, or brazing. All of these processes require close fit of the detail parts to-be-joined and this fit can be achieved by the above plastic flow tecnique.

I claim:

1. A method for fabricating an internally stiffened, aerodynamically shaped shell structure comprising the steps of:

a. providing first and second metallic face sheets having an excess volume of metallic material on at least one of said face sheets;

b. Placing said first sheet in a die assembly which is configured to produce the desired basic aerodynamic shaped structure, said first face sheet having means to align said first face sheet in said die assembly;

c. placing at least one self-stable internal stiffener fabricated from metallic material upon said first face sheet, sand internal stiffener having a sufficient thickness to provide an adequate bonding area for joining the stiffener to the face sheets, a configuration which allows said self-stable member to provide sufficient support during the subsequent joining of said self-stable member to said face sheets, first and second ends which are received in said die assembly, and a height dimension which is greater than the net height requirement by approximately 0.01 to 0.08 inches to provide sufficient excess volume of said metallic material so as to provide positive fill in said die assembly for the desired amount of plastic flow of such material, and aligning said stiffener with respect to said first face sheet;

d. placing said second face sheet in said die assembly over said internal stiffener, said second face sheet having means to align said second face sheet in said die;

e. applying a forming an joining force to said internally stiffened structure for a sufficient duration at sufficient elevated temperature to cause intimate contact between opposed longitudinal edges of said face sheets and between said self-stable stiffener and adjacent areas of said face sheets by plastic flowing the excess volumes of material in the height of said self-stable internal stiffener and along the longitudinal edges of said face sheets, so as to join and bond said self-stable stiffener by solid state diffusion bonding to said face sheets and to join and bond said opposed longitudinal edges by homogeneous solid state diffusion bonding, thereby producing an aerodynamically shaped structure with leading and trailing edges, said forming and joining force being substantially localized in the to-be-joined areas and determined by the amount of excess material to be flowed and the plastic flow characteristics of the metal used.

2. The method of claim 1 wherein said internal stiffener and said face sheets are provided with tabs at each end thereof and said tabs are received in slots in said indexing means.

3. The method of claim 1 wherein said forming and joining forces are applied in an inert atmosphere at a temperature below the transformation temperature of the metal in said internally stiffened structure.

4. The method of claim 3 wherein said inert atmosphere is a vacuum of at least approximately $10^{-4}$ Torr.

5. The method of claim 3 wherein said forming and joining force is applied by the action of a die ram of a die assembly when said die assembly is installed within means for applying pressure the shape of said die ram being configured to achieve the desired contours of said aerodynamic structure.

6. The method of claim 3 wherein said die assembly is enclosed in metallic members which form a retort envelope, said retort envelope being configured to maintain said inert atmosphere.

7. The method of claim 3 wherein said die assembly is placed within an inert atmosphere furnace press, said furnace press being configured to maintain said inert atmosphere and temperature.

8. The method of claim 1 wherein a plurality of internal stiffeners are disposed between said first and second face sheets.

9. The method of claim 1 which said self-stable stiffener and said first and second face sheets are made of a metal selected from the group consisting of the wrought materials of titanium base alloys, aluminum base alloys, stainless steel alloys, nickel base alloys, cobalt base alloys and columbium base alloys.

10. The method of claim 1 in which said self-stable stiffener and said first and second face sheets are made of titanium base alloys.

11. The internally stiffened structure made by the method defined in claim 1.

12. A method for fabricating an internally stiffened, aerodynamically shaped shell structure comprising the steps of:

providing first and second metallic face sheets having a predetermined excess volume of material along the longitudinal edges of at least one of said face sheets and having a greater thickness than is required for the basic shell structure along said longitudinal edges and a reduced thickness away from the edges;

b. placing said first sheet in a die assembly which is configured to produce the desired basic aerodynamic shaped structure, said first face sheet having means to align said first face sheet in said die assembly;

c. placing at least one metallic self-stable internal stiffener upon said first face sheet, said internal stiffener having a sufficient thickness to provide an adequate bonding area for joining the stiffener to the face sheets, a configuration which allows said self-stable member to provide sufficient support during the subsequent joining of said self-stable member to said face sheets, and a predetermined excess volume of material in its height dimension, and aligning said stiffener with respect to said first face sheet;

d. placing said second face sheet in said die assembly over said internal stiffener, said second face sheet having means to align said second face sheet in said die;

e. applying a forming and joining force to said internally stiffened structure for a sufficient duration at sufficient elevated temperature to cause intimate contact between opposed longitudinal edges of said face sheets and between said self-stable stiffener and adjacent areas of said face sheets by plastic flowing the predetermined excess volumes of material in the height of said self-stable internal stiffener and along the longitudinal edges of said face sheets so as to join and bond said self-stable stiffener by diffusion bonding to said face sheets and to join and bond said opposed longitudinal edges, said excess volume of flow material causing increased solidity, thereby producing an aerodynamically shaped structure with leading and trailing edges, said forming and joining force being substantially localized in the to-be-joined areas and determined by the amount of excess material to be flowed and the plastic flow characteristics of the metal used.

13. The method of claim 12 including forming said reduced thickness of said face sheets by chemical milling.

14. The method of claim 12 including forming said reduced thickness of said face sheets by electrical discharge machining.

* * * * *